United States Patent

Nothnagle

[15] 3,650,597
[45] Mar. 21, 1972

[54] DARKFIELD CONVERTIBLE SUBSTAGE MIRROR

[72] Inventor: Paul E. Nothnagle, Rochester, N.Y.
[73] Assignee: Bausch & Lomb Incorporated, Rochester, N.Y.
[22] Filed: June 24, 1970
[21] Appl. No.: 49,454

[52] U.S. Cl. ............................. 350/87, 248/477, 248/488, 350/236
[51] Int. Cl. ....................................................... G02b 21/06
[58] Field of Search ........................ 350/87, 235, 236, 38; 248/477–488, 286

[56] References Cited

UNITED STATES PATENTS

| 3,490,828 | 1/1970 | Rehm | 350/87 |
| 1,128,761 | 2/1915 | Cornell | 350/38 |
| 1,840,248 | 1/1932 | Oishei | 248/480 |
| 1,521,339 | 12/1924 | Taylor | 350/38 |

Primary Examiner—David Schonberg
Assistant Examiner—Robert L. Sherman
Attorney—Frank C. Parker

[57] ABSTRACT

A substage mirror for illuminating a microscope is equipped with alternate mounting cavities for laterally displacing the mirror off the optical axis and tilting the mirror so as to direct a light beam through the subject but away from the objective, thereby providing darkfield illumination.

1 Claims, 5 Drawing Figures

Patented March 21, 1972

3,650,597

PAUL E. NOTHNAGLE
INVENTOR.

BY Frank C. Parker
ATTORNEY

DARKFIELD CONVERTIBLE SUBSTAGE MIRROR

BACKGROUND OF THE INVENTION

1. Field of the Invention

The field of my invention is microscope illumination mirrors, and more specifically, convertible mirror mounting apparatus for darkfield or brightfield illumination.

2. Description of the Prior Art

For the most part, only microscopes having substage lens-type condensers have darkfield illumination capability. Such microscopes are mostly high powered, for instance in excess of 100× magnification. Nonetheless, it is often desirable when using lower powered microscopes, to employ darkfield illumination.

U.S. Pat. No. 3,490,828 issued to Eberhard Rehm, Jan. 20, 1970, shows a simple approach to a convertible darkfield mirror system for low powered microscopes wherein two mirrors are employed, one fixed and one rotatable. The fixed mirror is substage and on-axis to the microscope optical system while the rotatable mirror is substage and to the front. Light from the illuminator strikes the rotatable mirror and is relayed, either directly to the stage for darkfield illumination, or by way of the fixed mirror for brightfield illumination. It may be noted, however, that such a system requires precious space at the front of the microscope for the rotatable mirror and calls for fairly delicate alignment of the fixed mirror.

SUMMARY OF THE INVENTION

My invention comprises apparatus for laterally displacing and tilting a single microscope illuminating mirror to permit easy interchange between brightfield and darkfield illumination. By adding an alternate mounting means to an ordinary mirror mount, the mirror can be moved to an off-axis position to relay a light beam through a subject but away from the microscope objective to achieve darkfield illumination.

DESCRIPTION OF THE PREFERRED EMBODIMENT

In typical brightfield illumination the light is directed to a subject on a microscope stage along the optical axis of the microscope so that the light will enter the microscope objective and continue up to the eyepiece for display of the image to the observer. Many subjects, such as those which are transparent and unstained, are lacking in contrast when seen in brightfield. When light shines through such subjects from the side, rather than from below, so that the light passes on and away from the microscope objective, the fine detail in such specimens, if it differs in refractive index from the material in which it is embedded, will scatter the light. Some of the light so scattered will enter the microscope objective, and, passing up through the optical system, will display to the observer a useful picture of the subject. Such side lighting is the key to darkfield illumination. Typically, in the higher powered microscopes, a complex paraboloid or cardioid condenser optical system is employed to produce a hollow cone of light with apex in the plane of the specimen. The center light rays in such a condenser being blocked, the peripheral rays form the cone, and, approaching the subject from all sides, continue on without entering the objective.

Side lighting from only one direction can also offer a useful form of darkfield illumination, and accordingly my convertible mirror can be employed with lower powered microscopes to provide both brightfield and darkfield illumination simply, compactly and with a minimum of manipulation.

Figure 1:
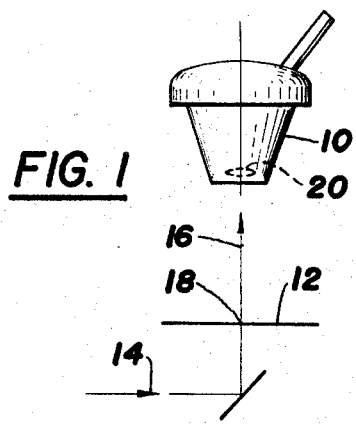
FIGS. 1 and 2 are diagrammatic illustrations of brightfield and darkfield illumination schemes utilizing my convertible substage mirror.
Figure 2:
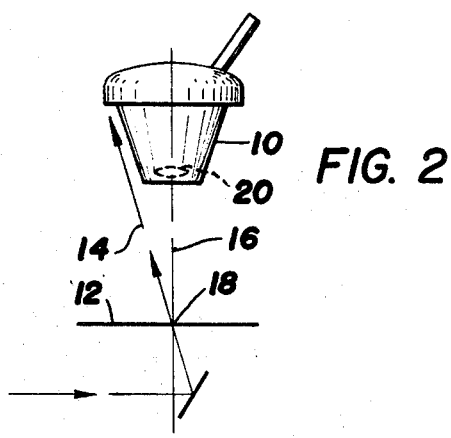

In FIGS. 1 and 2 respectively, are diagrams showing brightfield and darkfield illumination positions of my mirror. The microscope 10 is located by suitable support structure above a stage 12. A representative light ray 14 emanating from a light source, perhaps a microscope illuminator, is shown in FIG. 1 coincident with the optical axis 16, and, in FIG. 2, diverging therefrom. In both FIGS. 1 and 2, however, it will be noted that the ray 14 passes through the subject 18 which is to be examined. In FIG. 1 the ray 14 passes into the objective 20 and on through the microscope's optical system. In FIG. 2, however, the representative ray 14 passes away from the objective 20, leaving only such rays to enter it as may have been caused to reflect or scatter by details of the subject 18.

Figure 3:
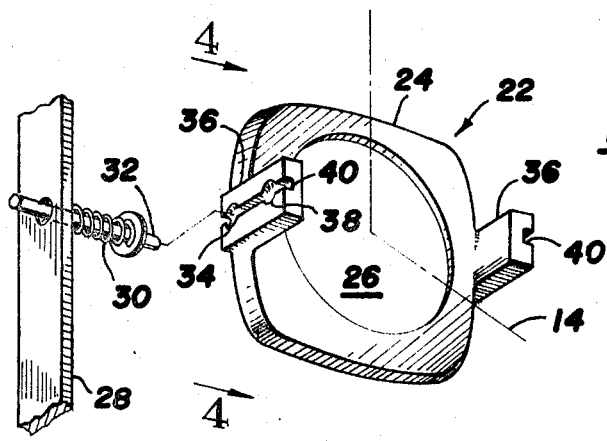
FIG. 3 is an exploded perspective view of my convertible substage mirror.

In FIG. 3 may be seen my substage mirror 22 comprising a mount 24 which is most conveniently of integral molded plastic, but which could suitably be formed in various ways of various materials. In the mount 24 is secured a reflecting element 26.

The mirror 22 is mounted upon a framework, such as the wall 28. The framework may be of any configuration, as perhaps a spring bracket anchored to the microscope base. The framework includes a resilient means, shown in FIG. 3 as the spring 30 which serves to urge the plunger 32 into the cavity 34. Corresponding wall, spring, plunger and cavity means serve to support the opposite side of mirror 22. The spring tension may be within a fairly broad range but should not be less than sufficient to inhibit gravity-induced movement of the mirror, nor enough to bind against manual adjustments.

The cavity 34 and its corresponding cavity on the opposite side of the mount are connected by an imaginary line which would pass substantially through the center of gravity of the mirror 22. The center of such an imaginary line would form an axis of rotation when the mirror is mounted at the cavity 34. For brightfield illumination the mirror 22 is rotated about this axis until the ray of light 14 coincides with the optical axis 16.

The cavity 34 is defined by material formed into a post 36 which extends upwardly from the main body of the mount 24. A second cavity 38 is formed above the cavity 34 in the post 36.

Figure 4:
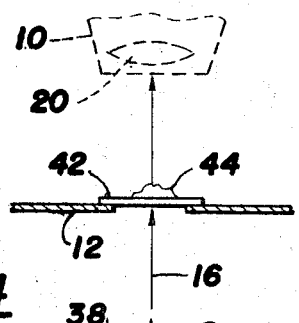
FIGS. 4 and 5 are side views of my mirror showing how it can be displaced to obtain darkfield illumination.
Figure 5:
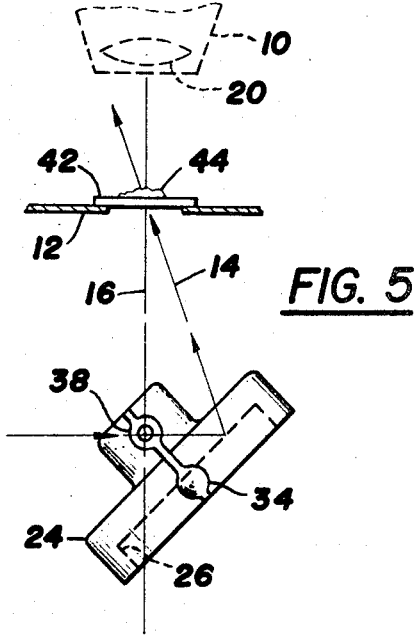

By withdrawing the plunger 32, I can now disengage the mirror 22 and move it along the groove 40 to a position where the plunger 32 may be re-engaged at the second cavity 38. This latter condition is illustrated in FIG. 5. As compared with FIG. 4 illustrating the brightfield mode, it will be observed that the ray 14 strikes the reflecting surface of the element 26 at a point in FIG. 5 substantially off the optical axis 16 and that the ray 14 proceeds thence through the microscope slide 42 and subject 44, but misses the objective 20.

Since light from the source does not directly enter the objective 20 the view presented to the observer will be dark except for such portions as result from rays reflected and scattered, by details of the subject, toward the objective, and these will therefor afford the observer a darkfield view of the subject.

I claim:

1. In substage mirror apparatus for a microscope of the kind having a base with resilient means and a mirror in a mount having first cavity means cooperative with said resilient means for retaining said mirror and mount in a position pivotally adjustable to a position in which a reflecting surface of said mirror is disposed for receiving rays from an illuminator and for reflecting said rays along an optical axis of said microscope through a subject on a stage of said microscope and into an objective lens of said microscope, the improvement comprising:

a member connected to said mirror mount and defining additional cavity means separate from said first cavity means, said additional cavity means being spaced from said first cavity means in a direction transverse to said reflective surface of said mirror a distance sufficient that, when said mount is retained in said additional cavity means, said reflective surface of said mirror may be pivotally adjusted to a position off said optical axis of said microscope for receiving said rays from said illuminator and for reflecting said rays through said subject on said stage but away from said objective lens of said microscope.

* * * * *